(12) United States Patent
Grosser-Samuels

(10) Patent No.: US 6,484,535 B2
(45) Date of Patent: *Nov. 26, 2002

(54) ADJUSTABLE JEWELRY ASSEMBLY

(76) Inventor: Jacquelin Grosser-Samuels, 520 Kentucky La., Fairview, TX (US) 75069

( * ) Notice: Subject to any disclaimer, the term of this patent is extended or adjusted under 35 U.S.C. 154(b) by 0 days.

This patent is subject to a terminal disclaimer.

(21) Appl. No.: 09/761,344

(22) Filed: Jan. 16, 2001

(65) Prior Publication Data

US 2001/0010160 A1 Aug. 2, 2001

Related U.S. Application Data

(63) Continuation-in-part of application No. 09/256,556, filed on Feb. 24, 1999, now Pat. No. 6,202,443.

(51) Int. Cl.⁷ ............................................. A44C 5/00
(52) U.S. Cl. .................. 63/3; 63/3.2; 63/23; 24/115 G
(58) Field of Search ................ 63/3, 3.1, 3.2, 63/21, 23; 24/115 G

(56) References Cited

U.S. PATENT DOCUMENTS

| 534,946 A | 2/1895 | Bates |
|---|---|---|
| 662,171 A | 11/1900 | Lederer |
| 1,419,370 A | 6/1922 | Genaille |
| 1,632,716 A | 6/1927 | Schweigert |
| 1,637,003 A | 7/1927 | Lang |
| 2,521,589 A | 9/1950 | Livingston |
| 2,529,058 A | 11/1950 | Tell et al. |

(List continued on next page.)

FOREIGN PATENT DOCUMENTS

| FR | 701902 | 1/1931 | |
|---|---|---|---|
| FR | 1276059 | 10/1961 | |
| NO | 67270 | * 6/1941 | ............... 24/115 G |

*Primary Examiner*—J. J. Swann
*Assistant Examiner*—Andrea Chop
(74) *Attorney, Agent, or Firm*—Alvin R. Wirthlin; Akin Gump Strauss Hauer & Feld LLP

(57) ABSTRACT

An adjustable jewelry assembly comprises a releasable clamping device and an elongate flexible member, such as a necklace or bracelet chain, that is releasably secured to the clamping device. The elongate flexible member forms a loop portion at one side of the clamping device and a pair of legs at an opposite side of the clamping device. The clamping device includes a cap and an insert slidably mounted in the cap. The legs extend; through openings in the cap and insert. A biasing member is located between the cap and insert for biasing the insert away from the cap. When the clamping device is at rest, the openings are misaligned and a shear force is applied to the legs, thereby securing the legs against slidable movement with respect to the clamping device. Pressing the cap and insert toward each other against the biasing force causes the openings to align and release the shear force so that the legs can slide with respect to the clamping device. In this manner, the size of the loop portion can be adjusted to accommodate the preferences of the jewelry wearer.

26 Claims, 10 Drawing Sheets

U.S. PATENT DOCUMENTS

| | | |
|---|---|---|
| 2,586,758 A | 2/1952 | Zerr |
| 3,074,135 A | 1/1963 | Brodowski |
| 3,075,266 A | 1/1963 | Gaupp |
| 3,080,867 A | 3/1963 | Eichinger |
| 3,187,396 A | 6/1965 | Carroll |
| 3,271,510 A * | 9/1966 | Decker et al. ............... 174/146 |
| 3,271,977 A | 9/1966 | Bohlinger et al. |
| 3,481,155 A | 12/1969 | Cook |
| 3,974,545 A | 8/1976 | Lossini |
| 4,328,605 A * | 5/1982 | Hutchison et al. ........ 24/115 G |
| 4,334,413 A | 6/1982 | Gaston et al. |
| 4,453,292 A * | 6/1984 | Bakker .................... 24/115 G |
| 4,506,417 A | 3/1985 | Hara |
| 4,551,993 A | 11/1985 | Nagahori |
| 4,611,368 A | 9/1986 | Battersby |
| 4,675,948 A | 6/1987 | Bengtsson |
| 4,881,302 A * | 11/1989 | Lee ......................... 24/136 R |
| 4,894,757 A | 1/1990 | Frusha et al. |
| 5,263,232 A | 11/1993 | Matoba |
| 5,279,132 A | 1/1994 | Swaim |
| 5,365,641 A | 11/1994 | Watanabe et al. |
| 5,459,903 A | 10/1995 | Treacy |
| 5,611,118 A | 3/1997 | Bibbee |
| 5,649,340 A * | 7/1997 | Ida ........................... 24/115 G |
| 5,678,282 A | 10/1997 | Stewart |
| 5,711,032 A | 1/1998 | Carpenter |
| 5,722,260 A | 3/1998 | Mangano |
| 5,737,808 A | 4/1998 | Ikeda |
| 5,774,957 A | 7/1998 | Kohl et al. |
| 5,778,904 A * | 7/1998 | Elsner ....................... 132/275 |
| 5,819,380 A | 10/1998 | Paolercio et al. |
| 5,826,309 A | 10/1998 | Tsamas |
| 6,202,443 B1 * | 3/2001 | Grosser-Samuels .............. 63/3 |

\* cited by examiner

ADJUSTABLE JEWELRY ASSEMBLY

This is a Continuation-in-part of application Ser. No. 09/256,556, filed on Feb. 24, 1999, now U.S. Pat. No. 6,202,443.

BACKGROUND OF THE INVENTION

1. Field of the Invention

This invention relates generally to jewelry, and more particularly to a jewelry assembly having a clamping device and a length of jewelry, such as a necklace, bracelet, anklet, and so on, adjustably held by the clamping device for adapting the hanging length of jewelry around a person to a desired amount to thereby accommodate the person's body size, clothing type, and fashion preferences.

2. Description of the Related Art

For many years, people have worn necklaces at various different lengths depending upon the prevailing fashion at the time. During some years the common length has been a short choker length of approximately fifteen inches. During other years the common length has been eighteen inches or longer. The trends in length have come and gone repeatedly over the decades.

Necklaces commonly comprise a fixed length of flexible chain made from one or more precious metals, such as gold, silver and platinum, and these chains are available in a wide variety of designs. The flexible chains are also commonly adorned with a wide variety of pendants, which generally comprise one or more precious stones, such as diamonds, rubies and sapphires, mounted in settings of precious metal. Purchasers of fine jewelry currently select a pendant of a desirable style and size and have it mounted on a flexible chain having a fixed length, which is usually fifteen, eighteen, twenty-four, or thirty inches. If the popular fashion changes, the pendant can in many cases later be mounted on a chain of a different length, but this generally requires the purchase of a new chain and also often requires the services of a professional jeweler to remove the pendant from the old chain and mount it on the new chain. Thus, mounting a pendant on a new chain can be inconvenient, time consuming and expensive.

Due to the wide variety of body shapes and sizes, a necklace chain of a given length will hang differently from person to person. For example, an eighteen-inch necklace chain which hangs at a fashionable length on an average-sized person would not hang at the same fashionable length on a relatively larger or relatively smaller person. In some cases, such persons have been unable to wear necklaces and other jewelry at appropriate fashionable lengths.

Moreover, the style and type of a person's clothing can interfere with the appearance of a necklace and affect the way the necklace hangs. For example, a pendant which hangs at approximately the same length as the neckline of the person's clothing can often be hidden from view by the clothing. Likewise, a pendant which hangs at a fashionable length when worn over light clothing may not hang at the same fashionable length when worn over relatively bulky clothing.

Many necklace chains include a clasp for connecting and separating opposite ends of the chain for mounting and dismounting the chain around a person's neck. Such clasps are relatively small in size and thus are relatively difficult to manipulate.

Accordingly, it is desirable to provide an adjustable jewelry assembly for adjusting the hanging length of jewelry, such as necklaces and/or pendants, to accommodate the particular size and clothing style of the wearer in a relatively quick and easy manner. Such a device would permit the wearer to precisely adjust the length of the necklace chain so that the pendant or other ornament hangs at the most appropriate and flattering position, regardless of the person's particular size and clothing style.

It is also desirable to provide an adjustable jewelry assembly for accommodating a wide variety of different fashionable lengths without requiring the person to purchase a new chain of a different length and have the pendent mounted on the new chain.

SUMMARY OF THE INVENTION

The present invention provides an adjustable clamping device for precisely adjusting the length of jewelry, such as necklaces, to easily and conveniently accommodate the particular size, clothing type, and fashion preferences of the wearer. Those skilled in the art will understand that the present invention is not limited to necklaces, but can also be readily applied to jewelry commonly worn elsewhere, such as around the waist, wrist and ankle.

An adjustable jewelry assembly according to the present invention comprises a releasable clamping device and an elongate flexible member releasably secured to the clamping device. The elongate flexible member forms a loop portion with the clamping device and is slidable in the clamping device to adjust the size of the loop portion. The clamping device includes an insert having opposite ends and a first opening extending through the insert, a cap slidably positioned on at least one of the insert ends, and a biasing member disposed between the cap and the at least one insert end. The cap includes a first aperture for alignment with the first opening. The elongate flexible member has a first leg, a second leg, and a loop portion disposed between the first and second legs. At least the first leg extends through the first aperture and the first opening. The first aperture and the first opening are misaligned under biasing force from the biasing member to thereby prevent relative movement between the clamping device and the first leg of the elongate flexible member. The clamping device is adapted to slide along the first leg to adjust the size of the loop portion of the flexible member when the cap and insert are moved relative to each other against the biasing force to thereby align the first aperture with the first opening.

According to one aspect of the invention, an ornament is slidably mounted on the loop portion of the flexible member. According to a further aspect of the invention, a cover member is provided for at least partially receiving the cap and insert. The cover can include one or more openings for receiving at least the first leg.

According to a further embodiment of the invention, an adjustable jewelry assembly comprises a clamping device and an elongate flexible member releasably secured to the clamping device. The clamping device includes an insert having opposite ends with first and second spaced openings extending through the insert, a cap slidably positioned on one of the insert ends, and a biasing member disposed between the cap and the one insert end. The cap includes first and second spaced apertures for alignment with the first and second openings, respectively. A first elongate, flexible element extends through the first aperture and the first opening and a second elongate, flexible element extends through the second aperture and the second opening. The first and second apertures are misaligned with the first and second openings, respectively, under biasing force from the biasing member to thereby prevent relative movement between the clamping device and the first flexible element. The clamping device is adapted to slide along the first and second flexible elements when the cap and insert are moved relative to each other against the biasing force to thereby align the first and second apertures with the first and second openings, respectively.

According to yet a further embodiment of the invention, an adjustable jewelry assembly comprises a clamping device and an elongate flexible member releasably secured to the clamping device. The clamping device includes an insert having opposite ends, an opening extending through the insert between the ends, and at least one tab extending generally outwardly from one of the ends. A cap is slidably positioned on the one insert end. The cap has an end wall, a continuous side wall projecting from the end wall, an aperture formed in the end wall for alignment with the insert opening, and a tab extending generally inwardly from an outer edge of the end wall. A biasing member is disposed between the cap and the one insert end. An elongate flexible member has a first leg, a second leg, and a loop portion disposed between the first and second legs. The first and second legs extend through the cap aperture and the insert opening. The aperture and the opening are misaligned under biasing force from the biasing member to thereby prevent relative movement between the clamping device and the legs of the elongate flexible member. The clamping device is adapted to slide along the legs to adjust the size of the loop portion of the flexible member when the cap and insert are moved relative to each other against the biasing force to thereby align the at least one aperture with the at least one bore. The insert tab abuts the cap tab under biasing force from the biasing member in the absence of the elongate flexible member to thereby prevent separation of the insert and cap.

BRIEF DESCRIPTION OF THE DRAWINGS

The preferred embodiments of the present invention will hereinafter be described in conjunction with the appended drawings, wherein like designations denote like elements, and further wherein.

Figure 1A:
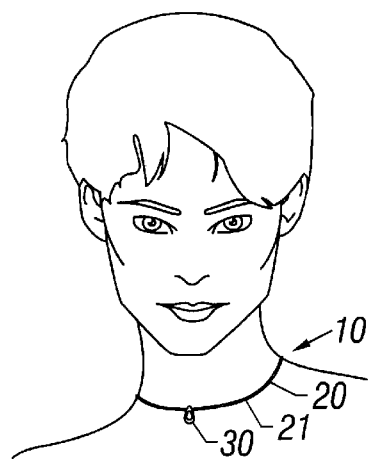
FIGS. 1A and 1B are front and rear views, respectively, showing an adjustable jewelry assembly according to the present invention placed around the neck of a wearer and adjusted to a relatively short length.

It is noted that the above-described drawings are intended to depict only typical embodiments of the invention and should not be considered as limiting the scope thereof. The invention will now be described in greater detail with further reference to the accompanying drawings.

DETAILED DESCRIPTION OF THE PREFERRED EMBODIMENTS

Referring now to the drawings, and to FIGS. 1A–1F and FIG. 2 in particular, an adjustable jewelry assembly 10 comprises a flexible member 20 and a clamping device 100. The flexible member 20 can be formed of any suitable material, such as metal, fabric, string, plastic or silicone, and is preferably formed of base metal, semi-precious metal or precious metal such as gold, silver and platinum, using methods that are well known in the art. As shown, the flexible member 20 includes a loop portion 21 extending from one side of the clamping device 100, and a pair of legs 22 and 23 extending from the opposite side of the clamping device. The loop portion 21 can extend around the neck of a wearer with the clamping device 100 located behind the neck and the legs 22 and 23 extending generally downward from the clamping device. The leg 22 terminates in a first free end to which a first end stop 24 is attached by means well known in the art, such as soldering. The leg 23 terminates in a second free end to which a second end stop 25 is attached by similar means. The first and second end stops 24 and 25 can be fashioned in a wide variety of decorative and ornamental shapes and can also comprise precious stones, such as diamonds, rubies and sapphires. Alternatively, the flexible member 20 can be a single continuous length of material which itself forms a loop and which therefore would not have a first free end or a second free end. Thus, in this alternative embodiment, the first end stop 24 and second end stop 25 would not be present.

An ornament 30, which can be a pendant comprising one or more precious stones, such as diamonds, rubies, sapphires and so on, can be mounted on the loop portion 21 of the flexible member 20. The ornament 30 is preferably mounted on the flexible member 20 according to means well known in the art so that the ornament 30 can freely slide along the length of the loop portion 21. Alternatively, the ornament 30 can be fixedly connected to the loop portion 21 in a well-known manner.

Figure 2:
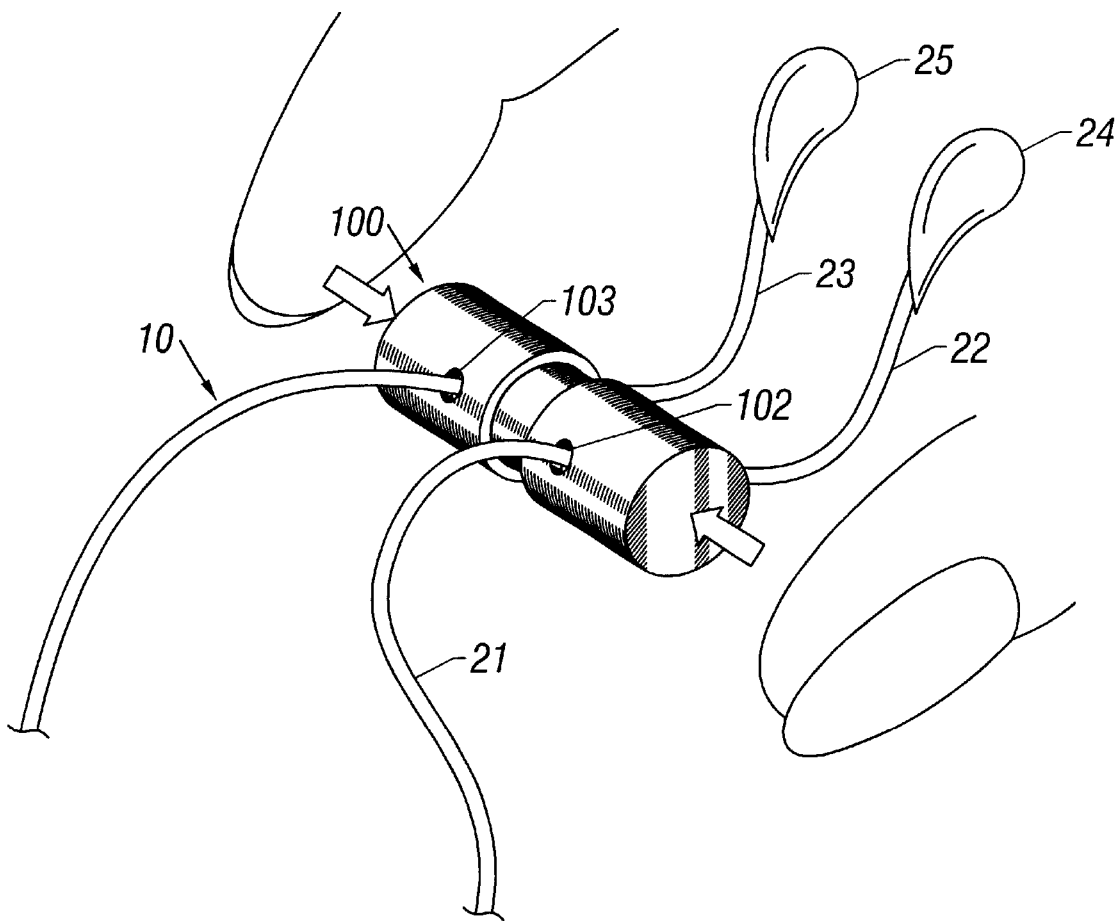
FIG. 2 is a perspective view of the adjustable jewelry assembly according to the present invention.
Figure 3:
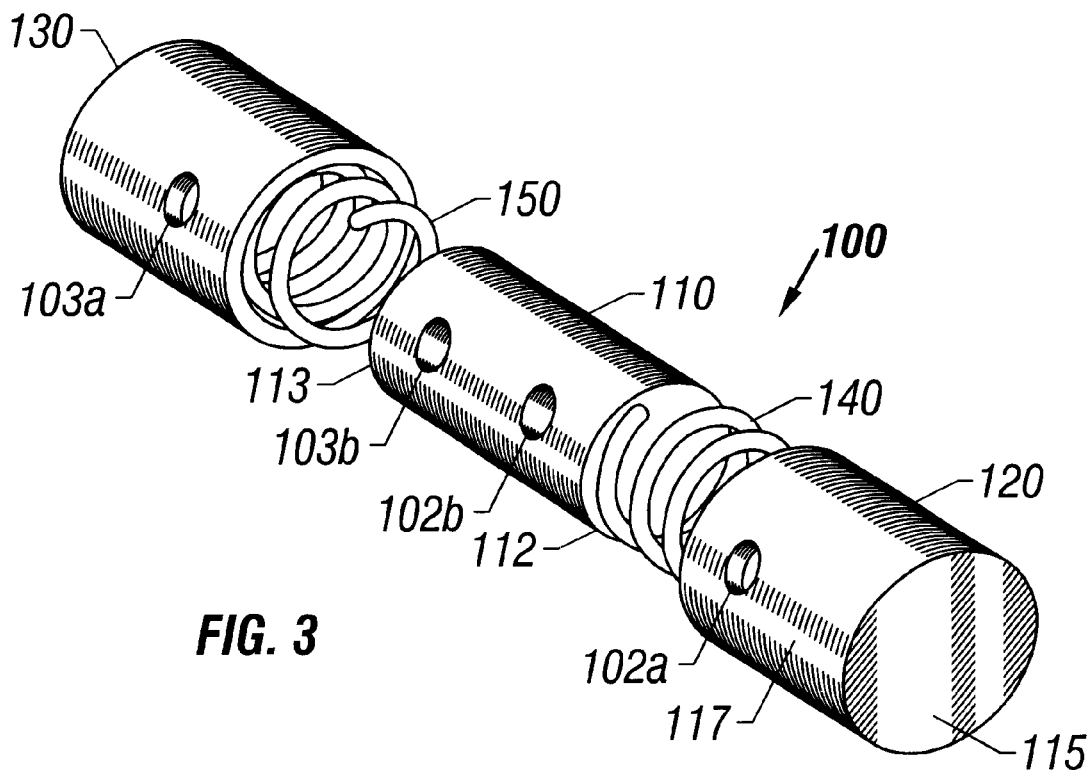
FIG. 3 is an exploded perspective view of a clamping device according to the present invention that forms part of the adjustable jewelry assembly of FIG. 2.
Figure 4:
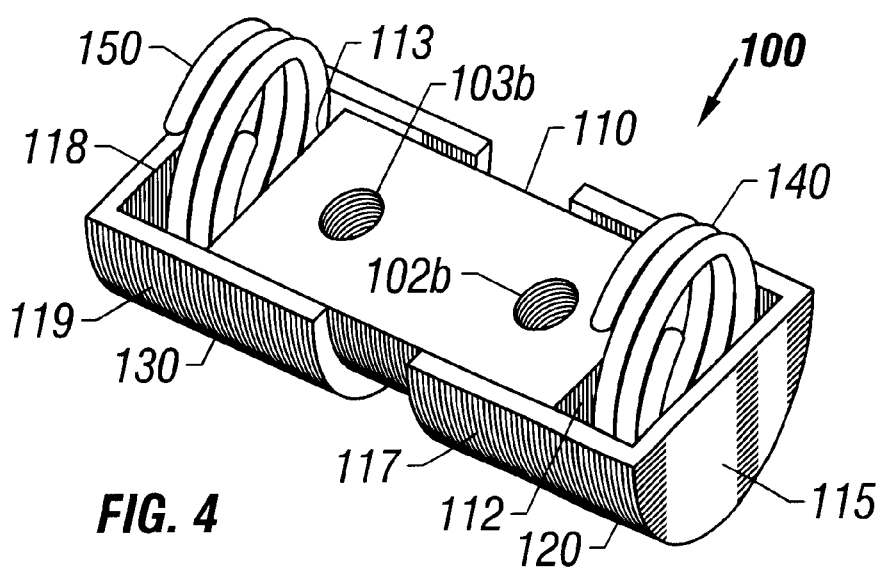
FIG. 4 is a longitudinal, perspective sectional view of the clamping device of FIG. 2.
Figure 5:
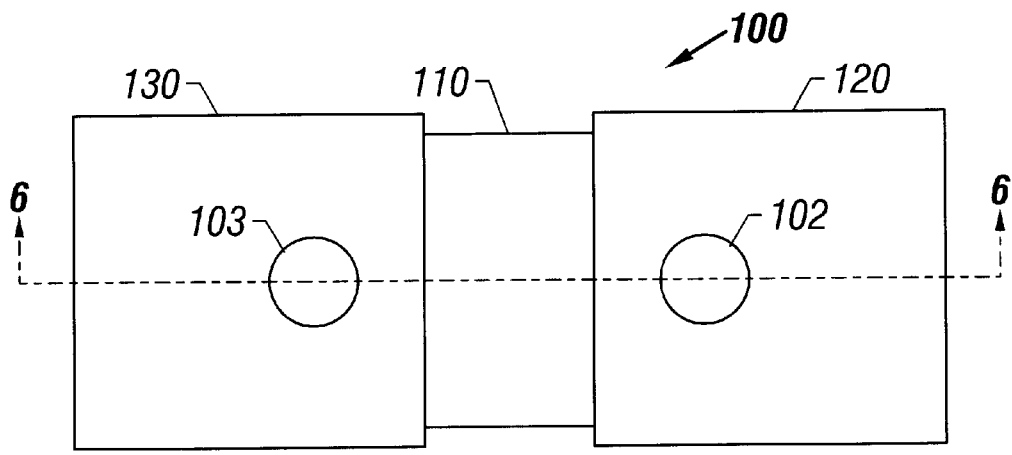
FIG. 5 is a top plan view of the clamping device.
Figure 6:
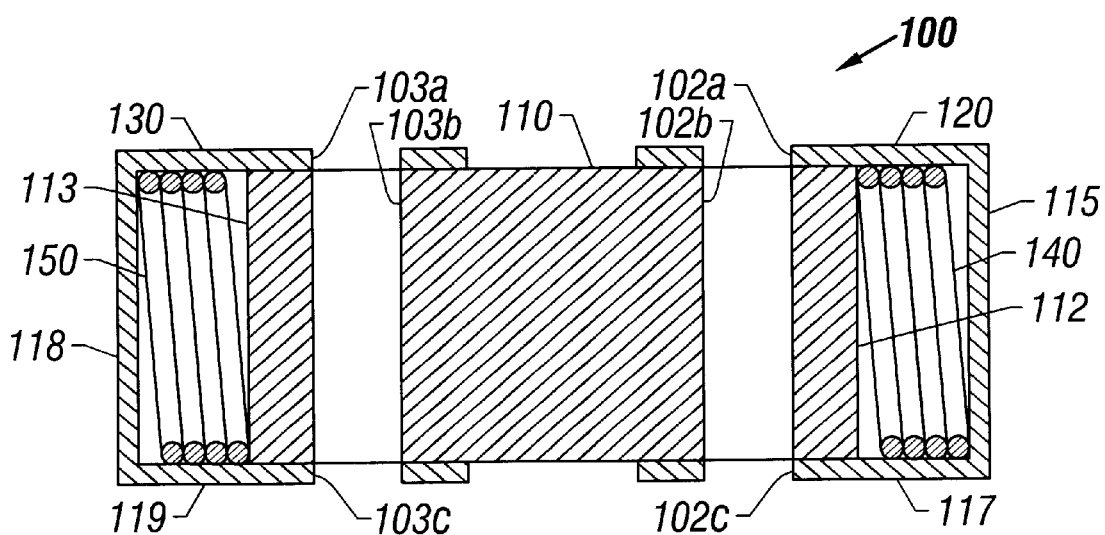
FIG. 6 is a sectional view of the clamping device taken along line 6—6 of FIG. 5.

As shown in FIG. 2, the legs 22 and 23 of the flexible member 20 extend through a first passage 102 and a second passage 103, respectively, of the clamping device 100. When portions of the clamping device are pressed toward each other, as represented by the arrows in FIG. 2, the clamping device 100 can slide freely along the length of the legs 22 and 23 so that the size of the loop portion 21 can be adjusted to accommodate the wearer. The construction of the clamping device 100 together with its operation will be described in greater detail below.

Figure 1B:
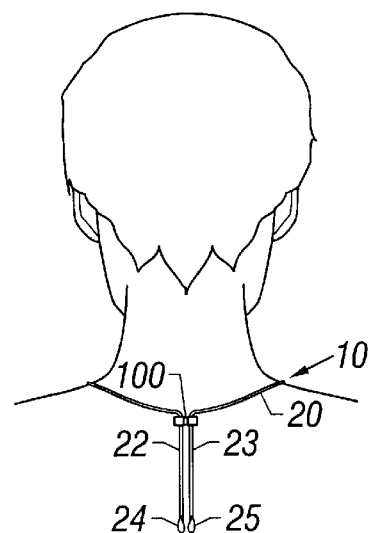

When the clamping device 100 is adjusted so that the loop portion 21 is of a relatively short length, the ornament 30, if utilized, hangs relatively higher on the front of the wearer's neck, with the legs 22 and 23 being of a relatively long length, as shown in FIGS. 1A and 1B.

Figure 1C:
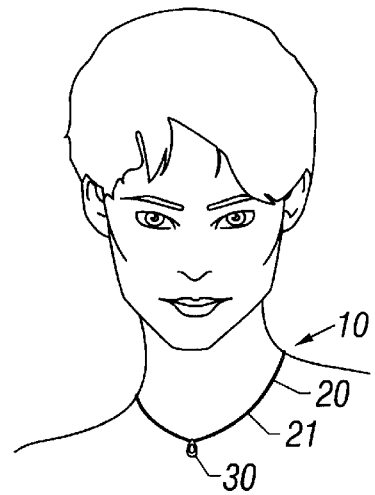
FIGS. 1C and 1D are front and rear views, respectively, showing the adjustable jewelry assembly according to the present invention around the neck of a wearer and adjusted to a relatively medium length.
Figure 1D:
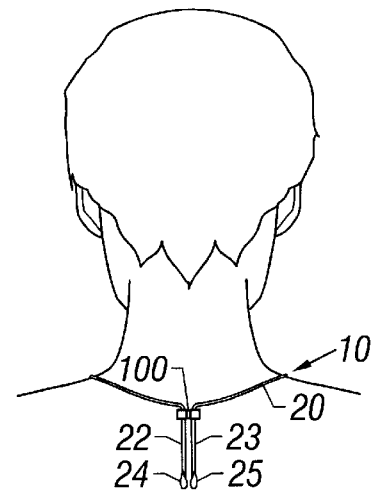

When the clamping device 100 is adjusted so that the loop portion 21 is of a relatively medium length, the ornament 30, if utilized, hangs relatively lower on the wearer's neck or chest, with the legs 22 and 23 being of a relatively medium length, as shown in FIGS. 1C and 1D.

Figure 1E:
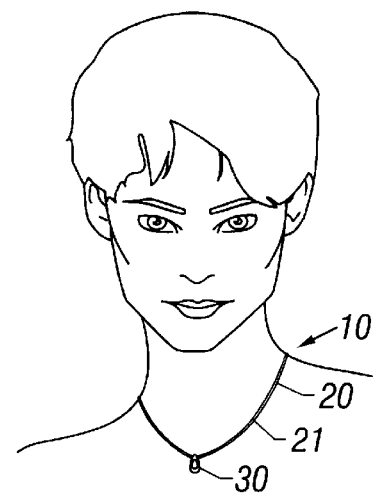
FIGS. 1E and 1F are front and rear views, respectively, showing the adjustable jewelry assembly according to the present invention around the neck of a wearer and adjusted to a relatively long length.
Figure 1F:
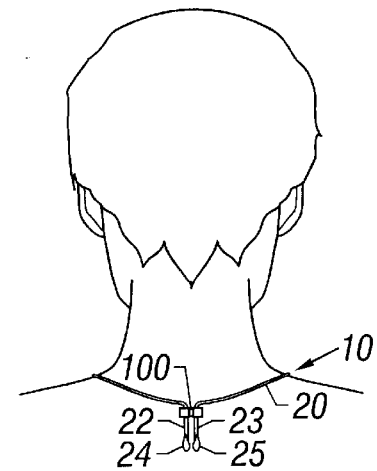

When the clamping device 100 is adjusted so that the loop portion 21 is of a relatively long length, the ornament 30, if utilized, hangs relatively lower on the wearer's neck or chest, with the legs 22 and 23 being of a relatively short length, as shown in FIGS. 1E and 1F.

Since the clamping device 100 can be positioned at any desired location along first and second legs 22 and 23, the loop portion 21 of the flexible member 20 can be adjusted to any desired size and thereby accommodate any desired length, regardless of the wearer's relative size, clothing styles, and fashion preferences.

With reference now to FIGS. 3 through 6, the clamping device 100 comprises an insert 110 having a first end 112 and a second end 113. A first cap 120 includes an end wall 115 and a continuous side wall 117 that projects from the end wall. The first cap 120 is biased away from the first end 112 by a first biasing member 140 that fits within the first cap and extends between the first end 112 of the insert 110 and the end wall 115 of the first cap. Likewise, a second cap 130 includes an end wall 118 and a continuous side wall 119 that projects from the end wall 118. The second cap 130 is biased away from the second end 113 by a second biasing member 150 that fits within the second cap and extends between the second end 113 of the insert 110 and the end wall 118 of the second cap. The first cap 120 has a pair of aligned apertures 102a and 102c that extend generally radially through the side wall 117 (shown in FIG. 6). The apertures 102a and 102c of the first cap 120 are sized to receive the leg 22 of the flexible member 20. Likewise, the second cap 103 has a pair of aligned apertures 103a and 103c that extend generally radially through the side wall 119. The apertures 103a and 103c are sized to receive the leg 23 of the flexible member 20.

The insert 110 preferably has a first bore 102b and a second bore 103b, which are sized to receive the leg 22 and leg 23, respectively, of the flexible member 20. The interior of the first cap 120 is dimensioned to slidably receive the first end 112 of the insert 110, and the interior of the second cap 130 is dimensioned to slidably receive the second end 113 of the insert. The first and second biasing members 140 and 150 are dimensioned to be received within the interior of the first cap 120 and the second cap 130, respectively. Preferably, the first and second biasing members are in the form of compression springs. Alternatively, leaf springs, elastomeric inserts or other biasing means can be used, as long as the biasing members exert sufficient force to prevent relative movement between the clamping device 100 and the first leg 22 and second leg 23, as will be described in greater detail below.

To assemble the clamping device 100, the first biasing member 140 is placed within the interior of the first cap 120. The first cap is then placed over the first end 112 of the insert 110 and slid along the insert against biasing force from the first biasing member 140 until the apertures 102a and 102c are aligned with the first bore 102b of the insert 110. The leg 22 of the flexible member 20, without the first end stop 24 attached, is then passed through passage 102 formed by alignment of the apertures 102a, 102c with the first bore 102b.

An ornament 30 (FIG. 1), if desired, is then mounted to the flexible member 20, preferably by sliding or stringing the second leg 23 through an aperture or other mounting means (not shown) of the ornament. The second biasing member 150 is then placed within the interior of the second cap 130. The second cap is then placed over the second end 113 of the insert 110 and slid along the insert against biasing force from the second biasing member 150 until the apertures 103a and 103c are aligned with the second bore 103b of the insert 110. The second leg 23 of the flexible member 20, without the second end stop 25 attached, is then passed through the passage 103 formed by alignment of the apertures 103a, 103c with the second bore 103b. The first end stop 24 can then be attached to the first free end of the first leg 22 and the second end stop 25 can be attached to the second free end of the second leg 23, using suitable attachment means, such as soldering. The first and second end stops 24 and 25 are preferably larger in cross dimension than the diameter of the passages 102 and 103 to thereby prevent disassembly of the adjustable jewelry assembly 10.

Relative movement between the clamping device 100 and the first leg 22 and second leg 23 is prevented when the clamping device 100 by shear forces applied to the first and second legs 22 and 23 by the first and second biasing members 140 and 150, respectively. In particular, the first biasing member 140 tends to force the first cap 120 away from the first end 112 of the insert 110, and thereby creates a misalignment between the first bore 102b and the apertures 102a and 102c. This misalignment produces a shear force on the first leg 22 at the apertures 102a and 102c. Likewise, the second biasing member 150 applies a shear force to the second leg 23 by creating a misalignment between the second bore 103b and the apertures 103a and 103c. The shear forces applied to the first and second legs 22 and 23 keep them firmly secured within their respective passages 102 and 103 when the clamping device 100 is in its normal, resting condition.

The clamping device 100 can easily be adapted to slide freely along the lengths of first and second legs 22 and 23 by pressing the first and second caps 120 and 130 toward each other, as shown by the arrows in FIG. 2, to compress the first and second biasing members 140 and 150. These external compressive forces reduce the misalignment between the first bore 102b and the apertures 102a and 102c, as well as the misalignment between the second bore 103b and the apertures 103a and 103c, to thereby reduce the shear forces applied to the legs 22 and 23. With the shear forces reduced, relative sliding movement between the clamping device 100 and the legs 22 and 23 can occur to thereby adjust the size of the loop portion 21 of the flexible member 20. The clamping device 100 can then return to its normal, clamping condition by simply removing the external compressive forces applied to the first cap 120 and second cap 130 to thereby clamp the legs 22 and 23 against movement with respect to the clamping device 100.

Figure 7:
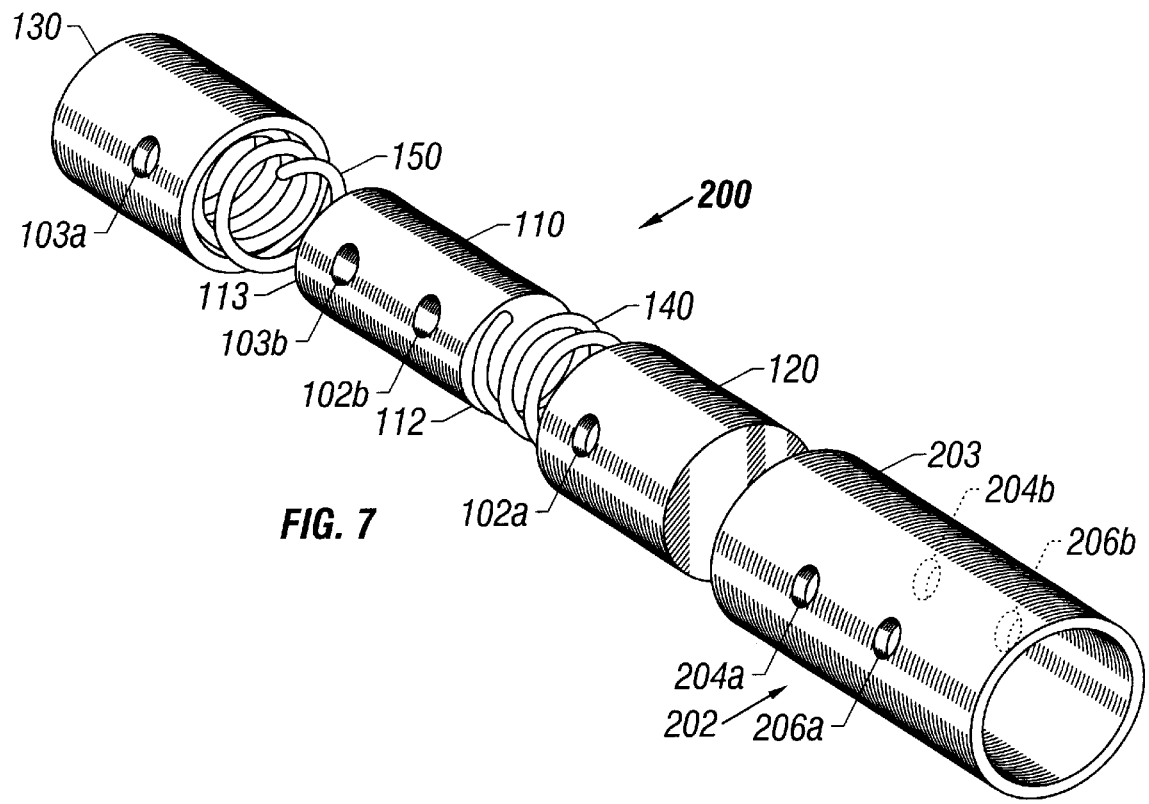
FIG. 7 is an exploded perspective view of a clamping device according to a second embodiment of the present Invention.
Figure 8:
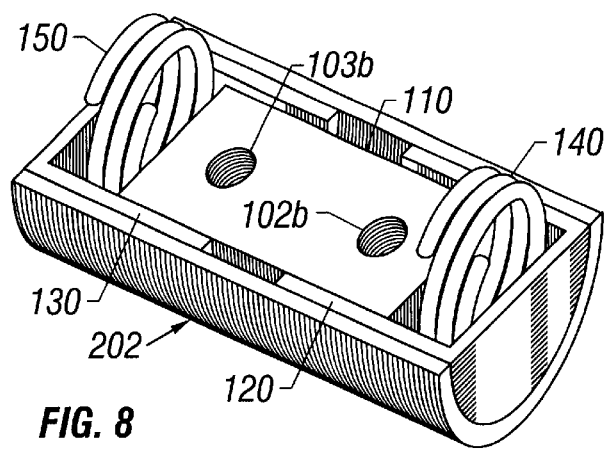
FIG. 8 is a longitudinal, perspective sectional view of the clamping device of FIG. 7.
Figure 9:
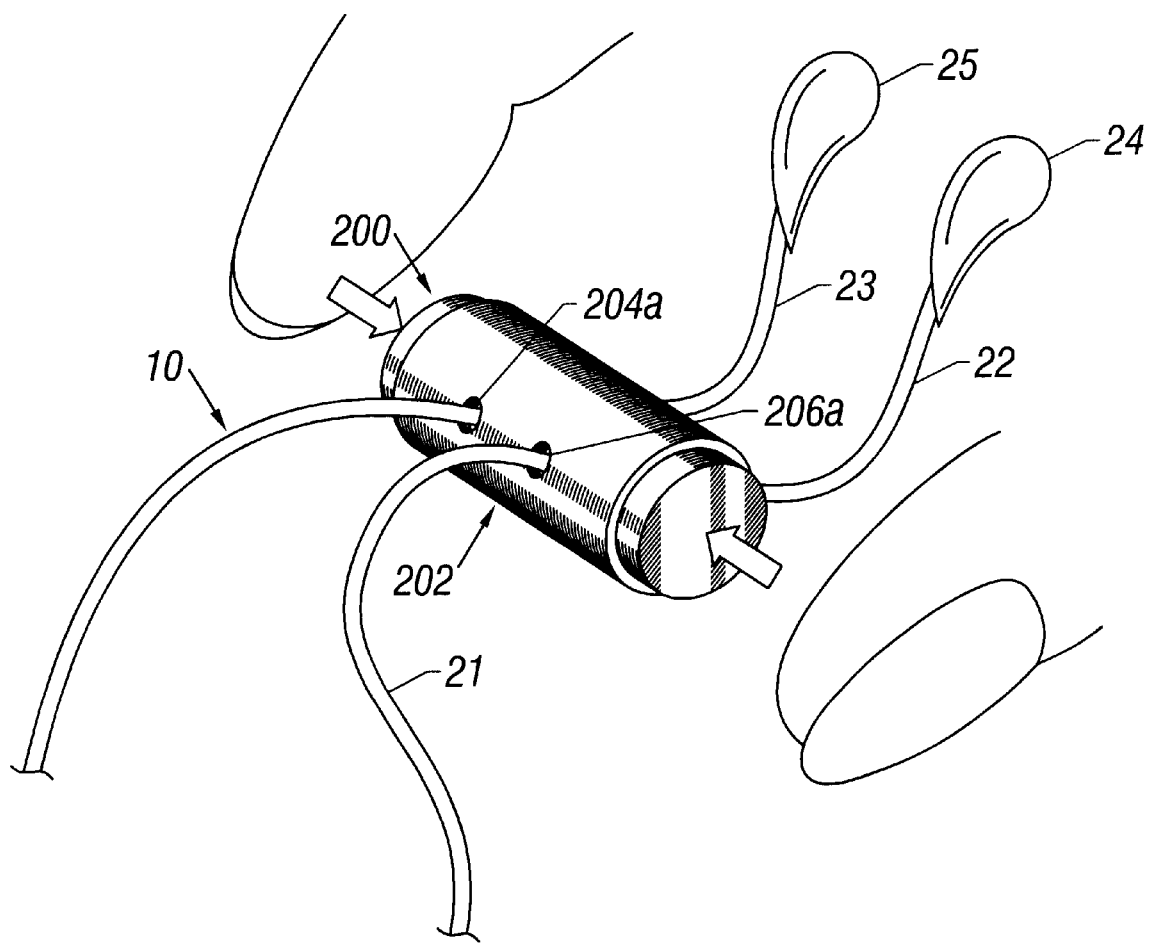
FIG. 9 is a perspective view of the adjustable jewelry assembly according to the present invention with the clamping device of the second embodiment.
Figure 10:
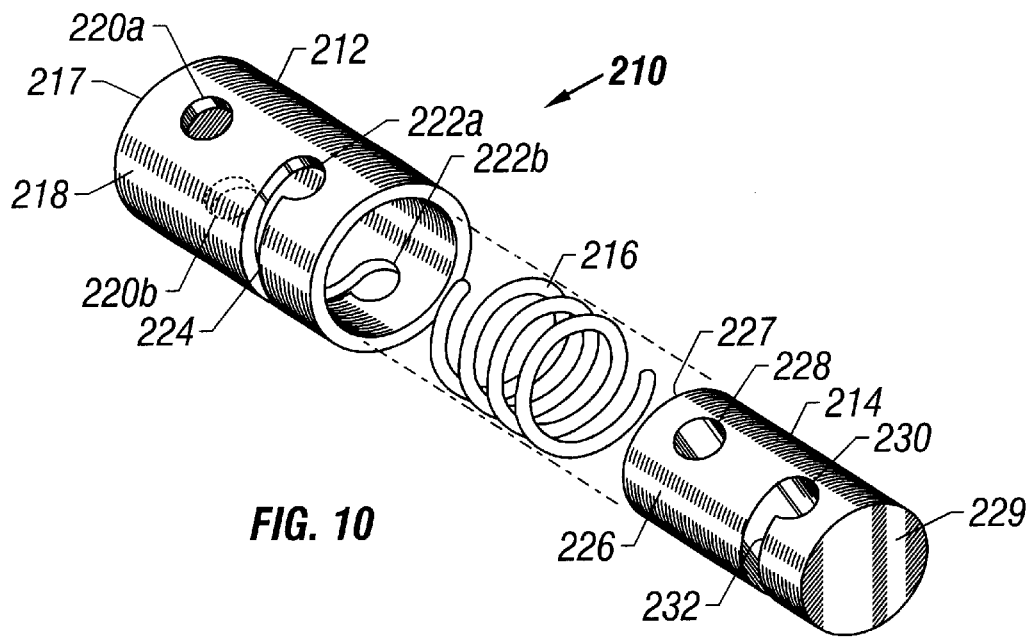
FIG. 10 is an exploded perspective view of a clamping device according to a third embodiment of the present invention.

With reference now to FIGS. 7–9, a clamping device 200 according to a second embodiment of the invention is illustrated, wherein like parts in the previous embodiment are represented by like numerals. The clamping device 200 is substantially identical to the clamping device 100 with the exception of a cover member 202 that is positioned over the caps 120, 130, and the insert 110.

The cover member 202 includes a hollow body 203 that is preferably cylindrical in shape with an inner diameter that is slightly greater than an outer diameter of the caps 120, 130. A first pair of aligned apertures 204a and 204b (shown in hidden line in FIG. 7), and a second pair of aligned apertures 206a and 206b (shown in hidden line) are formed in the hollow body 203. Preferably, the apertures 204a, 204b are in alignment with the bore 103b of the insert 110, while the apertures 206a, 206b are in alignment with the bore 102b of the insert 110 when the cover member 202 is installed over the caps 120, 130 and the insert 110.

As shown in FIG. 8, the cover member 202 is preferably of sufficient length to be coplanar with the end walls 115 and 118 of the caps 120 and 130, respectively, when the caps are completely depressed. In the normal, resting condition of the clamping device 100, the cover member 202 is preferably of sufficient length to cover the insert 110 and a portion of the caps 120, 130, as shown in FIG. 9. The cover member 202 can include one or more designs engraved or otherwise formed thereon, and/or one or more precious stones or other ornamental features.

Referring now to FIGS. 10–13, a clamping device 210 according to a third embodiment of the invention is illustrated, wherein like parts in the previous embodiments are represented by like numerals. The clamping device 210 includes an outer housing or cap 212, a plunger or insert 214 that is reciprocally received in the outer housing 212, and a biasing member 216 that is received in the outer housing to normally bias the plunger 214 outwardly from the housing.

The housing 212 includes an end wall 217 and a continuous side wall 218 that projects from the end wall 217. A first pair of aligned apertures 220a and 220b (shown in hidden line in FIG. 10) extend generally radially through the side wall 218. The first pair of apertures 220a and 220b are sized to receive the leg 22 of the flexible member 20. A second pair of aligned apertures 222a and 222b extend generally radially through the side wall 218 and are spaced from the first pair of aligned apertures 220a and 220b. The second pair of apertures 222a and 222b are sized to receive the leg 23 of the flexible member 20. A slot 224 is formed in the side wall 218 and extends between the second pair of apertures 222a and 222b. The slot is preferably of sufficient width to receive the leg 23 of the flexible member 20 during assembly of the flexible member 20 to the clamping device 210, as will be described in greater detail below.

The plunger 214 is preferably constructed from a solid rod or bar 226 with opposite end walls 227 and 229. A first bore 228 and a second bore 230 are formed in the bar 226 and extend generally radially through the bar. A distance between the first and second bores is substantially equal to a distance between the first and second pairs of apertures of the housing 212. The first bore 228 is sized to receive the leg 22 of the flexible member 20 and the second bore is sized to receive the leg 23 of the flexible member. A slot 232 is formed in the bar 226 and extends from an outer surface of the bar to the second bore 230. The slot is preferably of sufficient width to receive the leg 23 during assembly of the flexible member 20 to the clamping device 210, as will be described in greater detail below.

The plunger 214 is normally biased away from the end wall 217 of the housing 212 by the biasing member 216 that fits within the housing 212 between the end wall 217 of the housing and the end 227 of the plunger 214.

During assembly of the flexible member to the clamping device 210, the biasing member 216 is placed within the interior of the housing 212. The plunger 214 is then inserted into the housing 212 and slid along the housing against biasing force from the biasing member 216 until the apertures 220a and 220b are aligned with the first bore 228 of the plunger 214 and the apertures 222a and 222b are aligned with the second bore 230 of the plunger. The leg 22 of the flexible member 20, without the first end stop 24 attached, is then passed through the aperture 220a, the first bore 228, and the aperture 220b. The first end stop 24 can then be attached to the first free end of the first leg 22 and the second end stop 25 can be attached to the second free end of second leg 23, using suitable attachment means, such as soldering.

Figure 11:
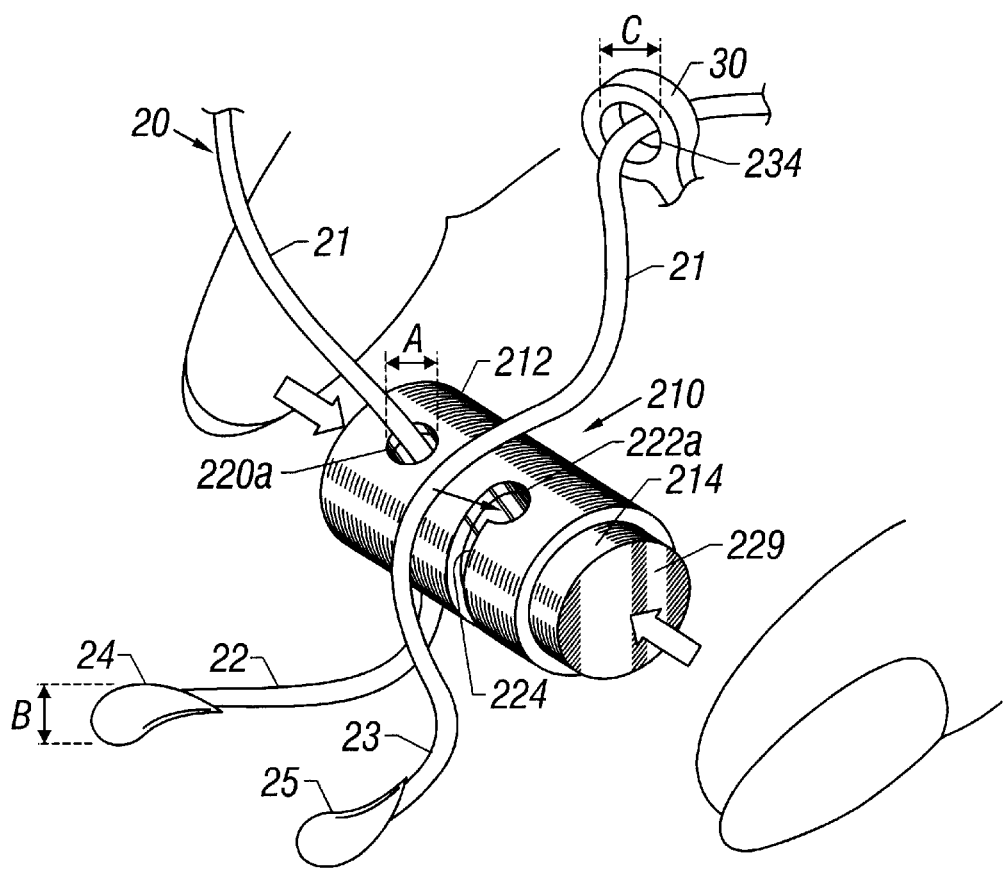
FIG. 11 is a perspective view of the clamping device of FIG. 10 and illustrating the manner in which a length of jewelry is inserted into the clamping device.

As shown in FIG. 11, the first and second end stops 24 and 25 have a cross dimension "B" that is preferably larger than a cross dimension "A" of the housing apertures and plunger bores to thereby prevent disassembly of the adjustable jewelry assembly 10 when the clamping device 210 is in its normal resting or clamped position. An ornament 30 (FIG. 11), if desired, can be mounted to and dismounted from the flexible member 20, preferably by sliding or stringing the second leg 23 through an aperture 234 or other mounting means of the ornament 30. Preferably, a cross dimension "C" of the aperture 234 is larger than the cross dimension "B" of the end stops 24 and 25 so that the ornament 30 can be dismounted from the flexible member 20 and another ornament be slidably mounted thereto. Although the apertures are shown as being generally round, it is to be understood that they may be oval or of any other shape.

Figure 12:
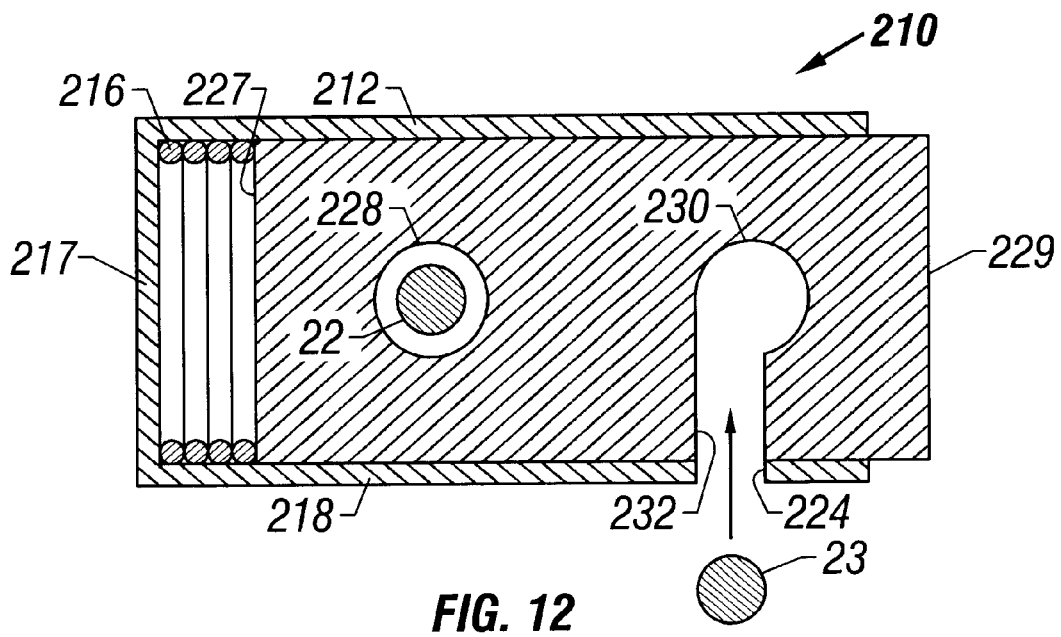
FIG. 12 is a longitudinal sectional view of the third embodiment clamping device in a compressed state.
Figure 13:
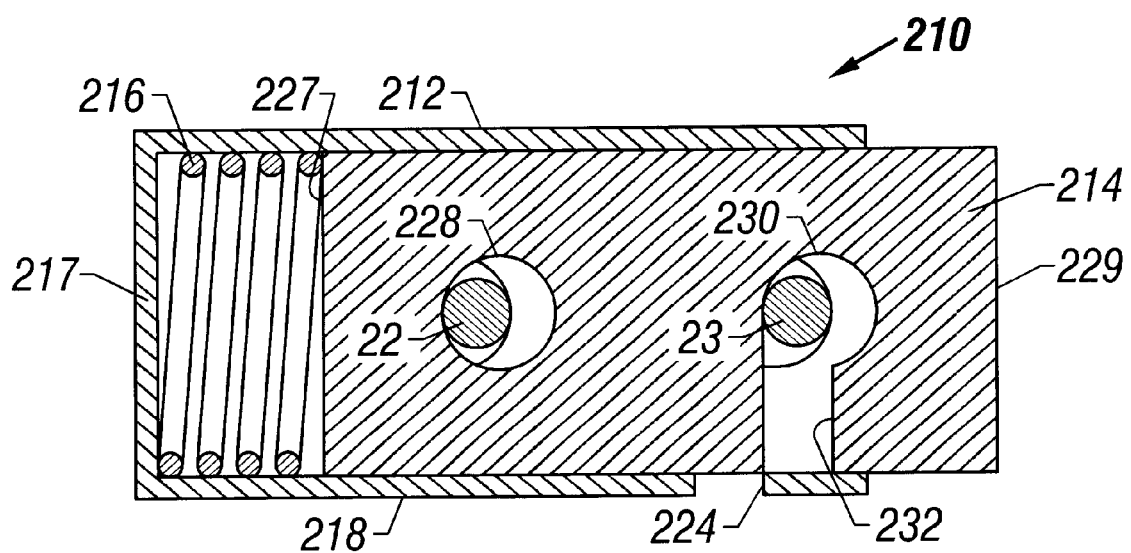
FIG. 13 is a longitudinal sectional view of the third embodiment clamping device in a released or clamping state.
Figure 14:
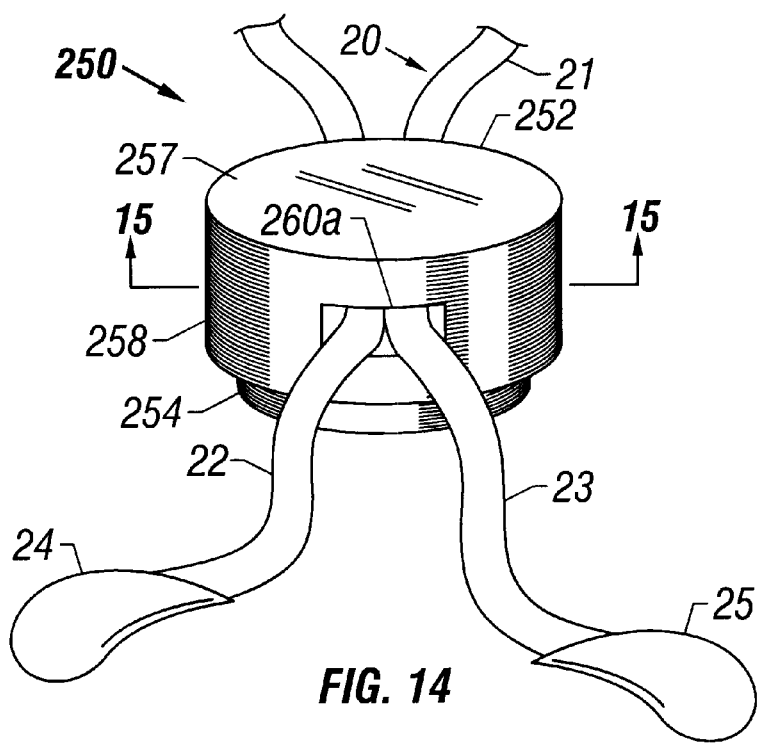
FIG. 14 is a perspective view of a clamping device according to a fourth embodiment of the invention, and illustrating the manner in which an elongate article of jewelry is received in the clamping device.

With additional reference to FIGS. 12 and 13, once an ornament 30 is mounted to or dismounted from the flexible member 20, the plunger can be retracted into the housing by pressing the end 229 of the plunger and the end wall 217 of the housing 212 toward each other as shown, until the slots and apertures are aligned. The leg 23 can then be inserted through the aligned slots 224 and 232 and into the aligned apertures 222a, 222b and bore 230. When the plunger 214 is released, the biasing member 216 tends to move the plunger outwardly of the housing 212 to create a misalignment between the first bore 228 and the first pair of apertures 220a and 220b and the second bore 230 and the second pair of apertures 222a and 222b. This misalignment produces a shear force on the first leg 22 at the apertures 220a and 220b and on the second leg 23 at the apertures 222a and 222b. The shear forces applied to the first and second legs 22 and 23 keep them firmly secured with respect to the clamping device 210. Preferably, the slot 232 of the plunger 214 is offset from the slot 224 of the housing 212 a sufficient amount to prevent the leg 23 of the flexible member from exiting the bore 228 and apertures 222a and 222b when the clamping device 10 is in the rest position, as shown in FIG. 13.

With this construction, the ornament 30 can be removed and replaced with another ornament by depressing the plunger 214 with respect to the housing 212 until the slots 224 and 232 are aligned, then removing the leg 23 from the clamping device 210. The ornament 30 can then be removed by sliding the leg 23 and stop 25 through the ornament aperture 234. A different ornament can then be installed on the flexible member 20 by reversing the same procedure. Since the cross dimension of the stops 24 and 25 are larger than the cross dimension of the apertures 220a, 220b of the housing 212 and the bore 228 of the plunger 214, the flexible member is permanently connected to the clamping device 210.

In addition to permitting the exchange of one ornament for another, the clamping device 210 can easily be adapted to slide freely along the lengths of first and second legs 22 and 23 by depressing the plunger 214 with respect to the housing 212 to compress the biasing member 216. This external compressive force reduces the misalignment between the first bore 228 and the apertures 220a and 220b, as well as the misalignment between the second bore 203 and the apertures 222a and 222b, which in turn reduces the shear forces applied to the legs 22 and 23. With the shear forces reduced, relative sliding movement between the clamping device 210 and the legs 22 and 23 can occur to thereby adjust the size of the loop portion 21 of the flexible member 20. The clamping device 210 can then be released by simply removing the external compressive force applied to the housing 212 and plunger 214 to thereby fix or secure the legs 22 and 23 against relative sliding movement with respect to the clamping device 210.

Although not shown, the clamping device 210 may include a cover member that extends over the housing 212 and a portion of the plunger 214. The cover member may include a slot and aligned apertures for receiving the flexible member 20. The slot may be eliminated if the apertures are larger in cross dimension than the stops 24 and 25.

With reference now to FIGS. 14–17, a clamping device 250 according to a fourth embodiment of the invention is illustrated, wherein like parts in the previous embodiments are represented by like numerals. The clamping device 250 includes an outer housing or cap 252, a plunger or insert 254 that is reciprocally received in the outer housing 252, and a biasing member 256 that is received in the outer housing to normally bias the plunger 254 outwardly from the housing.

The housing 252 includes an end wall 257 and a continuous side wall 258 that projects from the end wall 257. A pair of aligned openings 260a and 260b extend generally radially through the side wall 258. The openings 260a and 260b are sized to receive both legs 22 and 23 of the flexible member 20. A pair of tabs 262 and 264 are formed on an inner surface 266 of the side wall 258 and extend generally upwardly from a lower rim 268 of the housing 252. Each tab is generally hook-shaped with a first surface 270 that extends upwardly and outwardly from the rim, and a second surface 272 that forms an acute angle with the first surface.

The plunger 254 includes an end wall 280 and a continuous side wall 282 that projects from the end wall 280. A pair of aligned openings 284a (shown in hidden line in FIG. 17) and 284b extend generally radially through the side wall 282. The openings 284a and 284b are sized to receive both legs 22 and 23 of the flexible member 20. A pair of tabs 286 and 288 are formed on an outer surface 290 of the side wall 282 and extend generally downwardly from an upper rim 300 of the plunger 254. Each tab is generally inverse hook-shaped with a first surface 302 that extends downwardly and outwardly from the rim 300, and a second surface 304 that forms an acute angle with the first surface 302.

Figure 15:
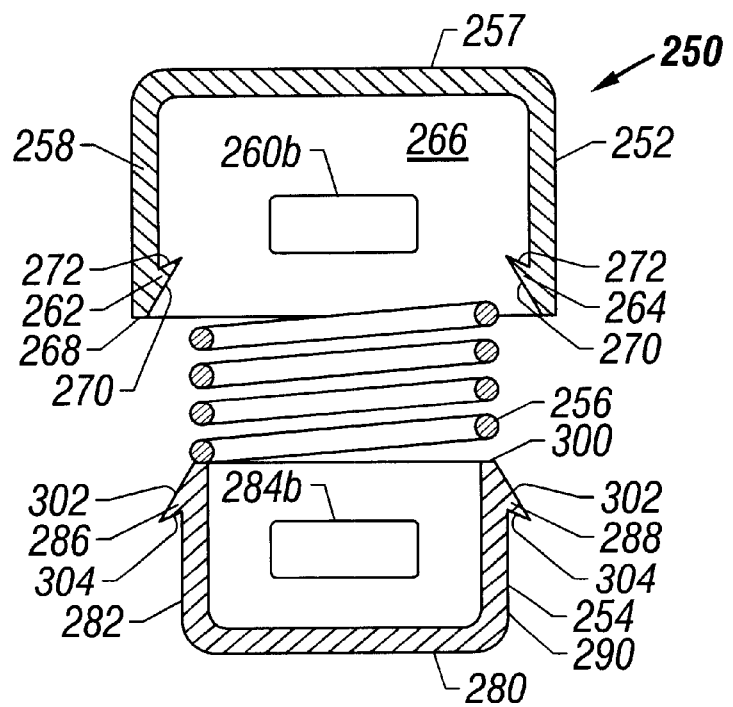
FIG. 15 is a sectional view of the fourth embodiment clamping device taken along line 15—15 of FIG. 14.
Figure 16:
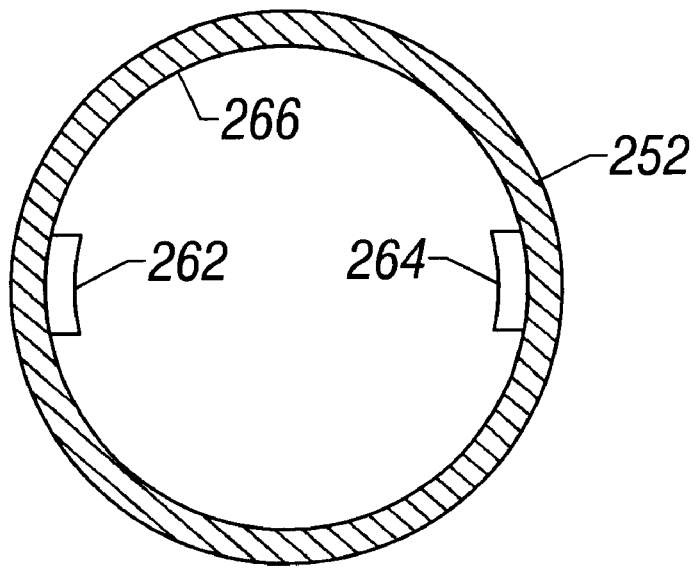
FIG. 16 is a diametrical sectional view of an outer housing portion that forms part of the clamping device of FIG. 14.
Figure 17:
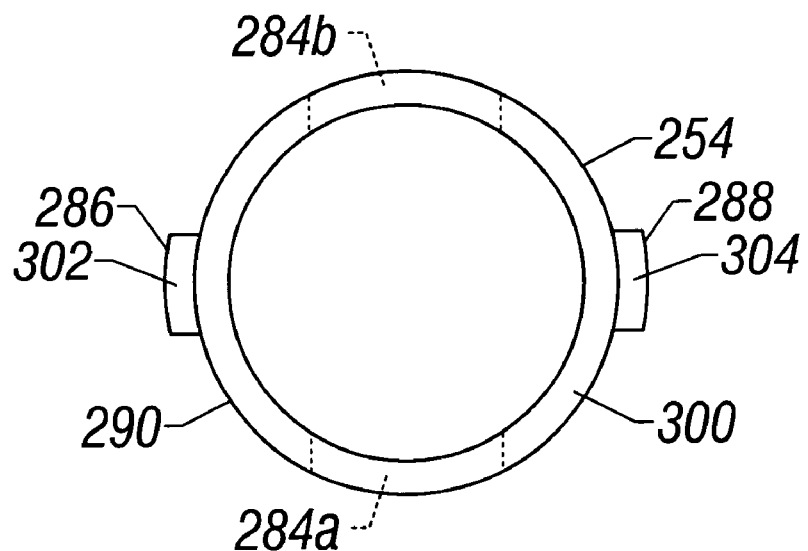
FIG. 17 is a front elevational view of an inner plunger portion that forms part of the clamping device of FIG. 14.

During assembly of the clamping device 250, and with particular reference to FIG. 15, the biasing member 256 is placed within the interior of the housing 252. The plunger 254 is then inserted into the housing 252 and slid along the housing against biasing force from the biasing member 256. The biasing member 256 preferably seats against the end wall 257 of the housing 252 and the upper rim 300 of the plunger 254 so that the biasing member 256 is clear of the flexible member 20 during use. Further movement of the plunger with respect to the housing causes the tabs 262 and 264 of the housing 252 to engage the tabs 286 and 288, respectively, of the plunger. The tabs of the housing and plunger are preferably sufficiently resilient to flex when pressed so that the tabs of the plunger can slide past the tabs of the housing. During movement, the surfaces 270 of the housing tabs engage the surfaces 302 of the plunger tabs. The surfaces 270 and 302 are angled to accommodate sliding movement of the plunger toward the end wall 257 of the housing and to promote mutual deflection of the housing tabs and plunger tabs. Once the plunger tabs are clear of the housing tabs, the angled surfaces 272 of the housing tabs engage the angled surfaces 304 of the plunger tabs under force from the biasing member 256 to thereby prevent disassembly of the clamping device 250.

Although not shown, guide means may be provided for preventing relative rotational movement between the housing 252 and plunger 254. In a further embodiment, the housing and plunger may be of non-cylindrical shape to thereby prevent relative rotational movement. In yet a further embodiment, the tabs may extend circumferentially around the housing and plunger so that mutual rotation between the housing and plunger will not cause the plunger tabs to disengage from the housing tabs.

When it is desired to mount a flexible member 20 to the clamping device 250, the housing 252 and plunger 254 are pressed toward each other until the openings 260a and 260b of the housing are aligned with the openings 284a and 284b of the plunger. The legs 22 and 23 of the flexible member 20, with or without their respective end stops 24 and 25, are then passed through the openings 260a, 284a, 284b and 260b. The plunger and housing can then be released to misalign the openings of the plunger and housing and thereby hold the flexible member 20 under shear forces, as previously described. If the end stops were not previously mounted to their respective ends, they can be done so at this point. The openings in the housing can be made sufficiently small to permit sliding movement of the clamping device 250 with respect to the flexible member 20, but not permit the end stops to pass through the openings. Alternatively, the openings may be sufficiently large to permit passage of the end stops therethrough.

While the invention has been taught with specific reference to the above-described embodiments, those skilled in the art will recognize that changes can be made in form and detail without departing from the spirit and the scope of the invention. By way of example, the end caps, inserts, cover member, housings, and plungers are shown as al, they may be formed of any desired shape. Moreover, although both legs of the flexible member are shown and described as being slidable with respect to the clamping device embodiments, one of the legs may be fixed with respect to the device, such that the loop portion is adjusted by sliding the other leg with respect to ping device. Thus, the described embodiments are to be considered in all respects illustrative and not restrictive. The scope of the invention is, therefore, indicated by the appended claims rather than by the foregoing description. All changes that come within the meaning and range of equivalency of the claims are to be embraced within their scope.

What is claimed is:

1. An adjustable jewelry assembly, comprising:
   a clamping device, the clamping device including:
   (a) an insert having opposite ends and an opening extending through the insert;
   (b) a cap slidably positioned on one of the insert ends, the cap including a aperture for alignment with the opening; and
   (c) a biasing member disposed between the cap and the one insert end;
   an elongate flexible member having first and second legs and a loop portion extending between the first and second legs;
   the first and second legs extending in the same direction through the aperture and the opening the aperture and the opening being misaligned under biasing force from the biasing member to thereby prevent relative movement between the clamping device and the first and second legs of the elongate flexible member, the clamping device being adapted to slide along the first and second legs to adjust the size of the loop portion of the flexible member when the cap and insert are moved relative to each other against the biasing force to thereby align the aperture with the opening; and
   a decorative pendant having a body portion that is larger than the aperture of the cap and slidably mounted on the loop portion of the flexible member.

2. An adjustable jewelry assembly according to claim 1, wherein the cap, the insert, and the elongate flexible member are constructed of at least one of a base metal, semi-precious metal, and precious metal material.

3. An adjustable jewelry assembly according to claim 1, wherein the first and second legs pass only once through the aperture and the opening.

4. An adjustable jewelry assembly according to claim 1, and further comprising first and second end stops attached to the first and second legs, respectively, of the elongate flexible member, the first and second end stops being larger than the aperture, such that the first and second legs are normally not removable from the clamping device through the aperture.

5. An adjustable jewelry assembly according to claim 1, wherein the body portion of the decorative pendant comprises a setting with at least one stone mounted in the setting.

6. An adjustable jewelry assembly according to claim 5, wherein the body portion is constructed of at least one of a precious and semi-precious metal material.

7. An adjustable jewelry assembly comprising:
   a clamping device, the clamping device including:
   (a) an insert having opposite ends and a first opening extending through the insert;
   (b) a cap slidably positioned on at least one of the insert ends, the cap including a first aperture for alignment with the first opening; and
   (c) a biasing member disposed between the cap and the at least one insert end;
   an elongate flexible member having a first leg and a loop portion extending from the first leg;
   the first leg extending through the first aperture and the first opening, the first aperture and the first opening being misaligned under biasing force from the biasing member to thereby prevent relative movement between the clamping device and the first leg of the elongate flexible member, the clamping device being adapted to slide along the first leg to adjust the size of the loop portion of the flexible member when the cap and insert are moved relative to each other against the biasing force to thereby align the first aperture with the first opening;
   an ornament slidably mounted on the loop portion of the flexible member; and
   a cover member, the cap and insert being at least partially received in the cover member.

8. An adjustable jewelry assembly according to claim 7, and further comprising a first aperture formed in the cover member, with the first leg extending through the first aperture of the cover member.

9. An adjustable jewelry assembly comprising:
   a clamping device, the clamping device including:
   (a) an insert having opposite ends and a first opening extending through the insert;
   (b) a cap slidably positioned on at least one of the insert ends, the cap including a first aperture for alignment with the first opening; and
   (c) a biasing member disposed between the cap and the at least one insert end;
   an elongate flexible member having a first leg, a second leg, and a loop portion extending between the first and second legs;
   the first leg extending through the first aperture and the first opening, the first aperture and the first opening being misaligned under biasing force from the biasing member to thereby prevent relative movement between the clamping device and the first leg of the elongate flexible member, the clamping device being adapted to slide along the first leg to adjust the size of the loop portion of the flexible member when the cap and insert are moved relative to each other against the biasing force to thereby align the first aperture with the first opening;
   an ornament slidably mounted on the loop portion of the flexible member; and
   wherein the insert further comprises a second opening and the cap further comprises a second aperture for alignment with the second opening, with the second leg extending through the second aperture and the second opening, the second aperture and the second opening being misaligned under biasing force from the biasing member to thereby prevent relative movement between the clamping device and the second leg of the elongate flexible member, the clamping device being adapted to slide along the second leg to adjust the size of the loop portion of the flexible member when the cap and insert are moved relative to each other against the biasing force to thereby align the second aperture with the second opening.

10. An adjustable jewelry assembly according to claim 9, and further comprising:
    a first slot extending between an outer surface of the insert and one of the first and second openings; and
    a second slot extending between an outer surface of the cap and one of the first and second apertures corresponding to the one opening;
    the first and second slots being sized to receive one of the first and second legs of the elongate member when the cap and insert are moved relative to each other against the biasing force to thereby align the second slot with the first slot such that the one leg can be inserted into and removed from the clamping device.

11. An adjustable jewelry assembly according to claim 10, and further comprising:
   a first end stop attached to the first leg of the flexible member; and
   a second end stop attached to the second leg of the flexible member;
   the first and second end stops being larger than the first and second apertures, respectively, such that the first and second legs are normally not removable from the clamping device through the apertures.

12. An adjustable jewelry assembly according to claim 11, and further comprising a pendant and a mounting aperture located on the ornament for receiving the elongate flexible member, the mounting aperture being larger at least the end stop associated with the one leg such that the ornament can be removed from the elongate flexible member when the one leg is removed from the clamping device.

13. A method of adjusting a jewelry assembly around a body part of a wearer, the method comprising:
   providing a jewelry assembly with an elongate, flexible member and a clamping device, the clamping device including:
      (a) an insert having opposite ends and an opening extending through the insert;
      (b) a cap slidably positioned on one of the insert ends, the cap including an aperture for alignment with the opening; and
      (c) a biasing member disposed between the cap and the one insert end;
   the elongate, flexible member having first and second flexible leg portions and a loop portion therebetween, with the first and second flexible leg portions extending through the aperture and the opening in the same direction, the aperture and the opening being misaligned under biasing force from the biasing member to thereby prevent relative movement between the clamping device and the first flexible leg portion;
   adjusting a size of the loop portion around the body part of the wearer by;
      (d) at least partially encircling the body part with the loop portion;
      (e) moving the insert and cap relative to each other against the biasing force to thereby align the first aperture with the first opening;
      (f) sliding the clamping device and at least the first leg portion relative to each other to thereby increase or decrease the size of the loop portion; and
      (g) releasing the insert and cap so that the biasing force causes misalignment of the aperture with the opening to thereby prevent relative movement between the clamping device and the elongate flexible member;
   wherein adjustment of the size of the loop portion causes the elongate, flexible member to be hung at different lengths with respect to the body part.

14. A method of adjusting a jewelry assembly according to claim 13, and further comprising slidably mounting a decorative pendant on the loop portion, the decorative pendant having a body portion with a decorative shape.

15. A method of adjusting a jewelry assembly according to claim 14, and further comprising sliding the decorative pendant along the loop portion after adjusting the size of the loop portion to thereby locate the decorative pendant at a middle of the loop portion.

16. A method of adjusting a jewelry assembly according to claim 13, wherein the clamping device includes a cover member extending over at least a portion of the insert and cap, with a first aperture formed in the cover member, the first flexible leg portion extending through the first aperture of the cover member.

17. A method of adjusting a jewelry assembly according to claim 16, wherein the cap, the insert and the cover member are cylindrical in shape.

18. A method of adjusting a jewelry assembly around a body part of a wearer, the method comprising:
   providing a jewelry assembly with an elongate flexible member and a clamping device, the clamping device including:
      (a) an insert having opposite ends with first and second spaced openings extending through the insert;
      (b) a cap slidably positioned on one of the insert ends, the cap including first and second spaced apertures for alignment with the first and second openings, respectively; and
      (c) a biasing member disposed between the cap and the one insert end;
   the elongate flexible member having a first leg extending through the first aperture and the first opening, a second leg extending through the second aperture and the second opening, and an elongate, flexible loop portion extending between the first and second legs, the first and second apertures being misaligned with the first and second openings, respectively, under biasing force from the biasing member to thereby prevent relative movement between the clamping device and the first and second legs,
   adjusting a size of the loop portion around the body part of the wearer by:
      (d) at least partially encircling the body part with the loop portion;
      (e) moving the inset and cap relative to each other against the biasing force to thereby align the first and second apertures with the first and second openings, respectively;
      (f) sliding the clamping device relative to the first and second legs to thereby increase or decrease the size of the loop portion; and
      (g) releasing the insert and cap so that the biasing force causes misalignment of the aperture with the opening to thereby prevent relative movement between the clamping device and the elongate flexible member;
   wherein adjustment of the size of the loop portion causes the elongate flexible member to be hung at different lengths with respect to the body part.

19. A method of adjusting a jewelry assembly according to claim, 18, wherein providing the clamping device further comprises providing a first slot extending between an outer surface of the insert and one of the first and second openings, and a second slot extending between an outer surface of the cap and one of the first and second apertures corresponding to the one opening, the first and second slots being misaligned under biasing force from the biasing member to thereby prevent movement of one of the first and second legs out of the one opening and the one aperture; and further comprising:
   moving the cap and insert relative to each other against the biasing force to thereby align the second slot with the first slot; and
   inserting the one leg into, or removing the one leg from, the one opening and the one aperture through the slot.

20. A method of adjusting a jewelry assembly according to claim 18, and further comprising:
   a first end stop attached to a free end of the first leg; and a second end stop attached to a free end of the second leg;

the first and second end stops being larger than the first and second apertures, respectively, such that the first and second legs are normally not removable from the clamping device through the apertures.

21. An adjustable jewelry assembly according to claim 18, wherein the openings are spaced longitudinally along the insert.

22. An adjustable jewelry assembly, comprising:

a clamping device, the clamping device including:
 (a) an insert having opposite ends with first and second spaced openings extending through the insert;
 (b) a cap slidably positioned on one of the insert ends, the cap including first and second spaced apertures for alignment with the first and second openings, respectively; and
 (c) a biasing member disposed between the cap and the one insert end;

an elongate flexible member having a first flexible element extending through the first aperture and the first opening, a second flexible element extending through the second aperture and the second opening, and a loop portion extending between the first and second flexible elements;

the first and second apertures being misaligned with the first and second openings, respectively, under biasing force from the biasing member to thereby prevent relative movement between the clamping device and the first flexible element, the clamping device being adapted to slide along the first and second flexible elements when the cap and insert are moved relative to each other against the biasing force to thereby align the first and second apertures with the first and second openings, respectively;

a first end stop attached to a free end of the first flexible element;

a second end stop attached to a free end of the second flexible element;

the first and second end stops being larger than the first and second apertures, respectively, such that the first and second flexible elements are normally not removable from the clamping device through the apertures; and an ornament slidably received on the elongate flexible member.

23. An adjustable jewelry assembly according to claim 22, and further comprising a mounting aperture located on the ornament for receiving the elongate flexible member, the mounting aperture being larger than at least one of the first and second end stops, such that the ornament can be removed from the elongate flexible member when at least one of the first and second flexible elements is removed from the clamping device.

24. An adjustable jewelry assembly, comprising:

a clamping device, the clamping device including:
 (a) an insert having opposite ends, an opening extending through the insert between the ends, and at least one tab extending generally outwardly from one of the ends;
 (b) a cap slidably positioned on the one insert end; the cap including an end wall, a continuous side wall projecting from the end wall, an aperture formed in the side wall for alignment with the insert opening, and at least one tab extending generally inwardly from the side wall; and
 (c) a biasing member disposed between the cap and the one insert end;

an elongate flexible member having a first leg, a second leg, and a loop portion disposed between the first and second legs;

the first and second legs extending through the cap aperture and the insert opening, the aperture and the opening being misaligned under biasing force from the biasing member to thereby prevent relative movement between the clamping device and the legs of the elongate flexible member, the clamping device being adapted to slide along the legs to adjust the size of the loop portion of the flexible member when the cap and insert are moved relative to each other against the biasing force to thereby align the aperture with the opening to thereby adjust a size of the loop portion;

the at least one insert tab abutting the at least one cap tab under biasing force from the biasing member in the absence of the elongate flexible member to thereby prevent separation of the insert and cap; and an ornament slidably received on the elongate flexible member, the ornament having a body portion that is larger than the aperture of the cap.

25. An adjustable jewelry assembly according to claim 24, wherein the at least one cap tab is generally hook-shaped.

26. An adjustable jewelry assembly according to claim 25, wherein the at least one insert tab is generally inverse hook-shaped.

* * * * *